(12) United States Patent
Pyo et al.

(10) Patent No.: US 9,115,991 B2
(45) Date of Patent: Aug. 25, 2015

(54) APPARATUS AND METHOD FOR DETECTING GYRO SENSOR SIGNAL

(75) Inventors: Seung Chul Pyo, Gyunggi-do (KR); Chang Hyun Kim, Gyunggi-do (KR)

(73) Assignee: Samsung Electro-Mechanics Co., Ltd., Suwon-Si (KR)

( * ) Notice: Subject to any disclaimer, the term of this patent is extended or adjusted under 35 U.S.C. 154(b) by 657 days.

(21) Appl. No.: 13/540,358

(22) Filed: Jul. 2, 2012

(65) Prior Publication Data

US 2013/0312516 A1    Nov. 28, 2013

(30) Foreign Application Priority Data

May 25, 2012   (KR) .................. 10-2012-0056269

(51) Int. Cl.
*G01C 19/5776* (2012.01)
(52) U.S. Cl.
CPC .................................. *G01C 19/5776* (2013.01)
(58) Field of Classification Search
CPC .................................................. G01C 19/5776
See application file for complete search history.

(56) References Cited

U.S. PATENT DOCUMENTS

| | | | |
|---|---|---|---|
| 5,551,292 A * | 9/1996 | Terajima et al. ........... | 73/504.12 |
| 5,648,608 A * | 7/1997 | Nakamura ................ | 73/504.12 |
| 6,288,474 B1 * | 9/2001 | Ono et al. ................ | 310/319 |
| 6,301,965 B1 * | 10/2001 | Chu et al. ................. | 73/514.18 |
| 7,434,466 B2 * | 10/2008 | Ito .......................... | 73/514.32 |
| 8,032,272 B2 * | 10/2011 | Dulac ...................... | 701/33.7 |
| 8,186,218 B2 * | 5/2012 | Nozawa ................... | 73/504.12 |
| 8,490,484 B2 * | 7/2013 | Kim ........................ | 73/504.12 |
| 8,701,487 B2 * | 4/2014 | Naruse et al. ............. | 73/504.12 |
| 8,966,977 B2 * | 3/2015 | Kim et al. ................. | 73/504.12 |
| 2012/0096942 A1 * | 4/2012 | Hayashi et al. ........... | 73/504.12 |
| 2013/0031950 A1 * | 2/2013 | Donadel et al. ........... | 73/1.77 |
| 2014/0290361 A1 * | 10/2014 | Kim et al. ................. | 73/504.12 |

FOREIGN PATENT DOCUMENTS

KR   10-2006-0017650   2/2006

* cited by examiner

*Primary Examiner* — Thomas J Hiltunen
(74) *Attorney, Agent, or Firm* — NSIP Law

(57) ABSTRACT

Disclosed herein are an apparatus and a method for detecting a gyro sensor signal. The apparatus includes: a preamplifier unit outputting sensing voltage and inverse phase sensing voltage; a sample and hold unit holding the sensing voltage and the inverse phase sensing voltage for a predetermined period at a predetermined point in time; an averaging unit removing offset; a current passing unit providing a current path of output voltage of the averaging unit; a comparing unit comparing a signal output from the averaging unit and reference voltage with each other to output a comparison signal; and a pulse counter unit generating and outputting a count signal that is in proportion to a width of the comparison signal.

14 Claims, 5 Drawing Sheets

APPARATUS AND METHOD FOR DETECTING GYRO SENSOR SIGNAL

CROSS REFERENCE TO RELATED APPLICATION

This application claims the benefit of Korean Patent Application No. 10-2012-0056269, filed on May 25, 2012, entitled "Apparatus and Method for Detecting Gyro Sensor Signal", which is hereby incorporated by reference in its entirety into this application.

BACKGROUND OF THE INVENTION

1. Technical Field

The present invention relates to an apparatus and method for detecting a gyro sensor signal.

2. Description of the Related Art

A gyro sensor, which is a sensor detecting angular velocity, has been mainly used in attitude control of an aircraft, a rocket, a robot, and the like, hand vibration compensation of a camera, a binoculars, and the like, an automobile sliding and rotating prevention system, navigation, and the like. Recently, the gyro sensor has been mounted in a smart phone, such that utilization thereof is very high.

There are several types of gyro sensors such as a rotation type gyro sensor, a vibration type gyro sensor, a fluid type gyro sensor, an optical type gyro sensor, and the like. The vibration type gyro sensor has been currently used mainly in a mobile product.

In addition, as the vibration type gyro sensor, a capacitive gyro sensor has been mainly used and a piezoelectric gyro sensor has been moderately used.

In the gyro sensor as described above, an apparatus for detecting a signal according to the prior art has performed modulation at a front end and has used a low pass filter at a rear end.

The apparatus for detecting a gyro sensor signal according to the prior art is configured of a charge amplifier, a modulator, an amplifier, and a low pass filter (LPF).

The charge amplifier detects a change in capacitance of the gyro sensor to output voltage in proportion to the change in capacitance, the modulator outputs a direct current signal in proportion to angular velocity in an output signal of the charge amplifier, the amplifier amplifies and outputs an output signal of the modulator, and the low pass filter filters and outputs an output signal of the amplifier.

Since the apparatus for detecting a gyro sensor signal according to the prior art as described above should be implemented by the modulator and a filter and use a circuit unit and a temperature compensation method in order to remove separate offset, a circuit of the apparatus is complicated, a size thereof increases, and a cost thereof increases.

Further, in the apparatus for detecting a gyro sensor signal according to the prior art, several circuits are added, such that significant noise is generated.

Further, in the case in which the apparatus for detecting a gyro sensor signal does not directly output an analog signal, but digitizes the analog signal, an analog to digital converter needs to be additionally implemented.

PRIOR ART DOCUMENT

Patent Document (Patent Document 1) Korean Patent Laid-Open Publication No. 2006-0017650

SUMMARY OF THE INVENTION

The present invention has been made in an effort to provide an apparatus and method for detecting a gyro sensor signal capable of having a reduced circuit size by using an offset removing circuit having a small size.

Further, the present invention has been made in an effort to provide an apparatus and method for detecting a gyro sensor signal capable of having a simplified structure and a reduced cost and size by generating a digitized signal without using an analog to digital converter.

According to a preferred embodiment of the present invention, there is provided an apparatus for detecting a gyro sensor signal, the apparatus including: a preamplifier unit outputting sensing voltage and inverse phase sensing voltage that are in proportion to a charge amount of a gyro sensor; a sample and hold unit holding the sensing voltage and the inverse phase sensing voltage of the preamplifier unit for a predetermined period at a predetermined point in time; an averaging unit synthesizing the sensing voltage and the inverse phase sensing voltage held in the sample and hold unit to remove offset; a current passing unit providing a current path of output voltage of the averaging unit; a comparing unit comparing a signal output from the averaging unit and reference voltage with each other to output a comparison signal; and a pulse counter unit counting the number of counting pulses up to before a state transistor of the comparison signal output from the comparing unit is generated to generate and output a count signal.

The sample and hold unit may include: a first switch passing the sensing voltage output from the preamplifier unit therethrough for a predetermined period at a predetermined point in time; a first capacitor charged with a signal passing through the first switch and held at the signal for a predetermined period; a second switch passing the inverse phase sensing voltage output from the preamplifier unit for a predetermined period at a predetermined point in time; and a second capacitor charged with a signal passing through the second switch and held at the signal for a predetermined period.

The averaging unit may include: a third switch passing the sensing voltage held in the sample and hold unit therethrough at a predetermined point in time; a fourth switch passing the inverse phase sensing voltage held in the sample and hold unit therethrough at a predetermined point in time; and a synthesizer synthesizing a signal passing through the third switch and a signal passing through the fourth switch to remove the offset.

The current passing unit may be a current source connected between an output terminal of the averaging unit and a ground.

The current passing unit may be a resistor connected between an output terminal of the averaging unit and a ground.

The current passing unit may be a metal oxide semiconductor field effect transistor (MOSFET) connected between an output terminal of the averaging unit and a ground.

The comparing unit may include: a reference voltage provider providing the reference voltage; and a comparator having one terminal connected to an output terminal of the averaging unit and the other terminal connected to the reference voltage provider and outputting the comparison signal generated by comparing the output signal of the averaging unit and the reference voltage with each other.

The reference voltage provider may be a voltage source connected between the comparator and a ground.

The voltage source may provide voltage that is in proportion to a change in temperature.

The reference voltage provider may be a resistor connected between the comparator and a ground.

The reference voltage provider may be a thermistor connected between the comparator and a ground.

According to another preferred embodiment of the present invention, there is provided a method for detecting a gyro sensor signal, the method including: (A) generating and outputting, in a preamplifier unit, sensing voltage and inverse phase sensing voltage that are in proportion to a charge amount of a gyro sensor; (B) holding, in a sample and hold unit, the sensing voltage and the inverse phase sensing voltage output from the preamplifier unit for a predetermined period at a predetermined point in time; (C) synthesizing, in an averaging unit, the sensing voltage and the inverse phase sensing voltage held and output in the sample and hold unit to remove offset; (D) comparing, in a comparing unit, a signal output from the averaging unit and reference voltage with each other to output a comparison signal; and (E) generating and outputting, in a pulse counter unit, a count signal corresponding to a width of the comparison signal output from the comparing unit.

Step (B) may include: (B-1) allowing the sample and hold unit to pass the sensing voltage output from the preamplifier unit therethrough at a predetermined point in time; (B-2) allowing the sample and hold unit to charge a first capacitor with the passed sensing voltage to hold the sensing voltage for a predetermined period; (B-3) allowing the sample and hold unit to pass the inverse phase sensing voltage output from the preamplifier unit therethrough at a predetermined point in time; and (B-4) allowing the sample and hold unit to charge a second capacitor with the passed inverse phase sensing voltage to hold the inverse phase sensing voltage for a predetermined period.

Step (C) may include: (C-1) allowing the averaging unit to pass the sensing voltage output from the sample and hold unit therethrough; (C-2) allowing the averaging unit to pass the inverse phase sensing voltage output from the sample and hold unit therethrough; and (C-3) allowing the averaging unit to synthesize the sensing voltage and the inverse phase sensing voltage to remove the offset.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
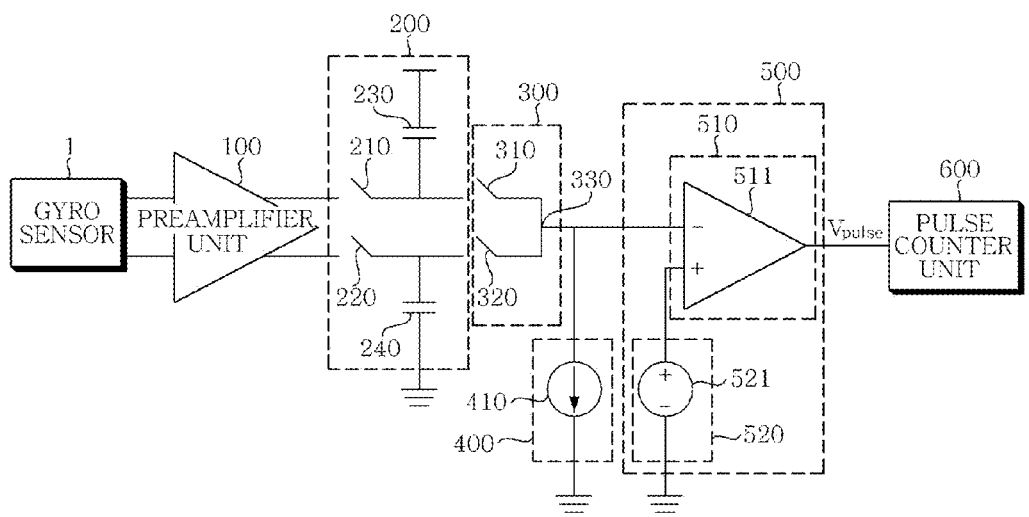
FIG. 1 is a configuration diagram of an apparatus for detecting a gyro sensor signal according to a first preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a configuration diagram of an apparatus for detecting a gyro sensor signal according to a first preferred embodiment of the present invention.

Referring to FIG. 1, the apparatus for detecting a gyro sensor signal according to the first preferred embodiment of the present invention is configured to include a preamplifier unit 100, a sample and hold unit 200, an averaging unit 300, a current passing unit 400, a comparing unit 500, and a pulse counter unit 600.

The preamplifier unit 100 converts a change in the charge amount of a gyro sensor 1 into sensing voltage to output the sensing voltage. At the same time, the preamplifier unit 100 outputs inverse phase sensing voltage in which a phase of the sensing voltage that is in proportion to the change in the charge amount is delayed by 90 degrees.

Further, the sample and hold unit 200 holds the sensing voltage output from the preamplifier 100 at a predetermined point in time and also holds the inverse phase sensing voltage at a predetermined point in time (a point in time having a phase difference of 90 degrees from the sensing voltage).

The sample and hold unit 200 may include two switch devices 210 and 220 and two capacitors 230 and 240 each connected between an output terminal of each of the two switch devices 210 and 220 and a ground.

Next, the averaging unit 300 synthesizes up outputs of the sample and hold unit 200 that are opposite to each other to remove offset.

The averaging unit 300 may include two switches 310 and 320 and a synthesizer 330, wherein the two switches 310 and 320 are simultaneously turned on to synthesize the outputs of the sample and hold unit 200 that are opposite to each other, thereby removing the offset.

The current passing unit 400 discharges charges charged in the sample and hold unit 220 to slowly reduce a magnitude of a signal output from the averaging unit 300. The current passing unit 400 may be implemented by a current source 410 generating micro current.

Next, the comparing unit 500 compares the output voltage of the averaging unit 300 with a reference voltage level to output a comparison signal corresponding to a level difference between the output voltage and the reference voltage level.

The comparing unit 500 includes a comparator 510 and a reference voltage provider 520.

The pulse counter unit 600 counts the number of counting pulses up to before a state transition of the comparison signal output from the comparing unit 500 is generated to generate and output a count signal that is in proportion to a pulse width.

As described above, the count signal output from the pulse counter unit 600 is in proportion to an amplitude of the sensing signal.

An operation of the apparatus for detecting a gyro sensor signal configured as described above will be described.

First, the preamplifier unit 100 converts the change in the charge amount of the gyro sensor into the sensing voltage to output the sensing voltage and at the same time, outputs the inverse phase sensing voltage of the voltage that is in proportion to the change in the charge amount.

Figure 2A:
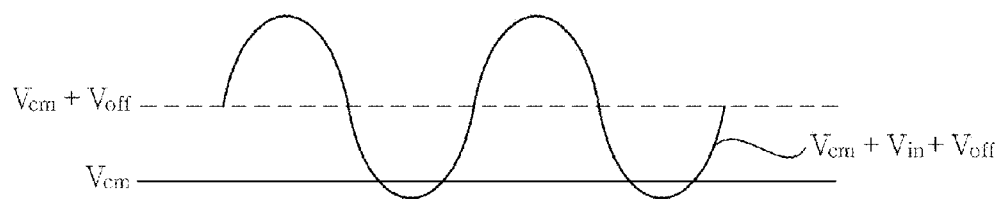
FIGS. 2A to 2H are signal wave diagrams in each terminal of the apparatus for detecting a gyro sensor signal of FIG. 1.

Here, an example of the output sensing voltage of the preamplifier unit 100 is shown in FIG. 2A. In the output sensing voltage of the preamplifier unit 100, which is a signal having a sine wave, vibration of the gyro sensor is reflected, such that there is a change in an amplitude.

The sensing voltage output from the preamplifier unit 100 has a sine wave shape in which variation voltage Vin is vertically changed based on the sum of reference voltage Vcm and offset voltage Voff.

Figure 2B:
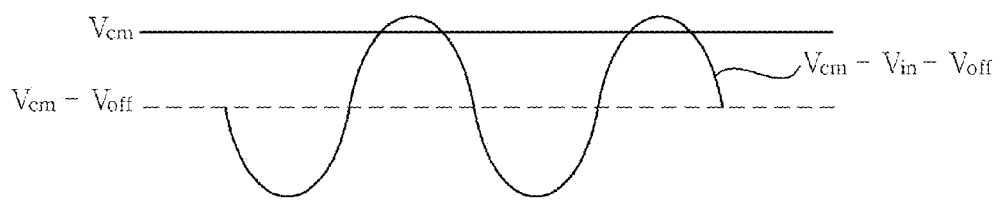

In addition, an example of the output inverse phase sensing voltage of the preamplifier unit 100 is shown in FIG. 2B. In the inverse phase sensing voltage of the preamplifier unit 100, which is a signal having a sine wave, the vibration of the gyro sensor is reflected, such that there is a change in an amplitude.

The inverse phase sensing voltage output from the preamplifier unit 100 has a sine wave shape in which variation voltage Vin is vertically changed based on the sum of the reference voltage Vcm and an inverse phase signal of the offset voltage Voff while having a phase delayed by 90 degrees.

As described above, the offset voltage may be included in the signal output from the preamplifier unit 100. Therefore, in order to obtain accurate output characteristics of the gyro sensor, the offset needs to be removed in the signal output from the preamplifier unit 100.

Meanwhile, the sample and hold unit 200 holds the sensing voltage output from the preamplifier unit 100 at a predetermined point in time and also holds the inverse phase sensing voltage at a predetermined point in time (a point in time having a phase difference of 90 degrees from the sensing voltage).

Figure 2C:
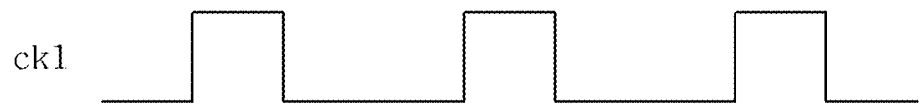

More specifically, a first switch 210 is turned on or off according to a clock signal ck1 provided at a predetermined period as shown in FIG. 2C to hold and output the signal output from the preamplifier unit 100 at a predetermined point in time.

In this case, a first capacitor 230 is charged according to a signal output at a state in which the first switch 210 is turned on. The first capacitor 230 is charged as described above, such that when the first switch 210 is turned off, a predetermined voltage is held at an output terminal.

The signal passing through the first switch 210 and then held and output in the first capacitor 230 still includes the offset voltage.

Figure 2D:

In addition, a second switch 220 is turned on or off according to a clock signal ck2 provided at a predetermined period as shown in FIG. 2D to hold and output the signal of the inverse phase sensing voltage output from the preamplifier unit 100 at a predetermined point in time.

In this case, a second capacitor 240 is charged according to a signal output at a state in which the second switch 220 is turned on. The second capacitor 240 is charged as described above, such that when the second switch 220 is turned off, a predetermined voltage is held at an output terminal.

The signal passing through the second switch 220 and then held and output in the second capacitor 240 still includes the offset voltage.

Then, the averaging unit 300 synthesizes two signals output from the sample and hold unit 200 to remove the offset and then output the signal in which the offset is removed.

Figure 2E:
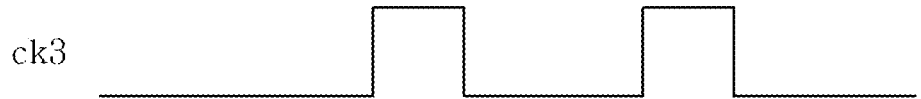

That is, two switches, that is, third and fourth switches 310 and 320, configuring the averaging unit 300 are simultaneously turned on by a clock signal ck3 as shown in FIG. 2E to pass the signal passing through the first switch 210 and then held and output in the first capacitor 230 and the signal passing through the second switch 220 and then held and output in the second capacitor 240 therethrough, and the synthesizer 330 synthesizes the signals passing through the third and fourth switches 310 and 320 to output a signal in which the offset voltage is removed.

The signal which is output from the averaging unit 300 and in which the offset is removed is input to the comparing unit 500, and the current passing unit 400 discharges charges charged in the capacitors 230 and 240 of the sample and hold unit 200.

When the charges charged in the capacitors 230 and 240 of the sample and hold unit 200 are discharged by the current passing unit 400, an amplitude of the signal output from the averaging unit 300 is slowly reduced.

Figure 2F:

Meanwhile, the comparing unit 500 compares the signal output from the averaging unit 300 and a magnitude of the reference voltage with each other (See FIG. 2F) to output positive voltage (or negative voltage) when the signal output from the averaging unit 300 is larger than the reference voltage and output negative voltage (or positive voltage) when the signal output from the averaging unit 300 is smaller than the reference voltage.

The comparing unit 500 performing this function includes the comparator 510 and the reference voltage provider 520.

The comparator 510 may be implemented by a differential amplifier 511 having an inverting terminal connected to an output terminal of the averaging unit 300 and a non-inverting terminal connected to the reference voltage provider 520.

Figure 2G:
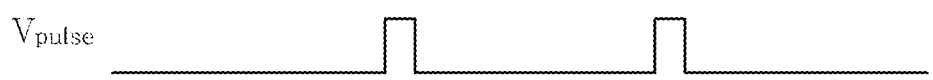

The voltage of the signal output from the averaging unit 300 is slowly reduced by the current passing unit 400. Therefore, a state transition of an output signal of the comparator 510 from positive voltage to negative voltage occurs (See FIG. 2G).

The reference voltage provider 520 of the comparing unit 500 provides a predetermined reference voltage to the inverting terminal of the comparator 510. More specifically, the reference voltage provider 520 of the comparator 500 may detect an internal temperature of the apparatus for detecting a gyro sensor signal to provide a reference voltage value changed according to the detected internal temperature.

That is, in the case in which the internal temperature of the apparatus for detecting a gyro sensor signal is increased, the reference voltage provider 520 may provide the reference value gradually increased according to the increased internal temperature.

Figure 2H:
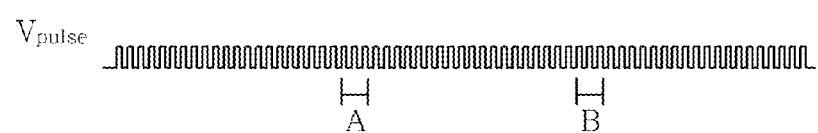

Next, the pulse counter unit 600 counts the number of counting pulses (See FIG. 2H) up to before the state transition of the comparison signal output from the comparing unit 500 is generated to generate and output the count signal (a count signal in a period A is 3 and a count signal in a period B is 3 in FIG. 2H) that is in proportion to the pulse width. As described above, the count signal output from the pulse counter unit 600 is in proportion to the amplitude of the sensing signal.

According to the preferred embodiment of the present invention as described above, an offset removing circuit relatively smaller as compared to the prior art is used, thereby making it possible to reduce a size of the circuit.

In addition, according to the preferred embodiment of the present invention, a digitized signal is generated without using an analog to digital converter, thereby making it possible to simplify a structure and reduce a cost and a size.

Further, according to the preferred embodiment of the present invention, the signal is digitized, such that it is advantageous in view of noise.

Figure 4:
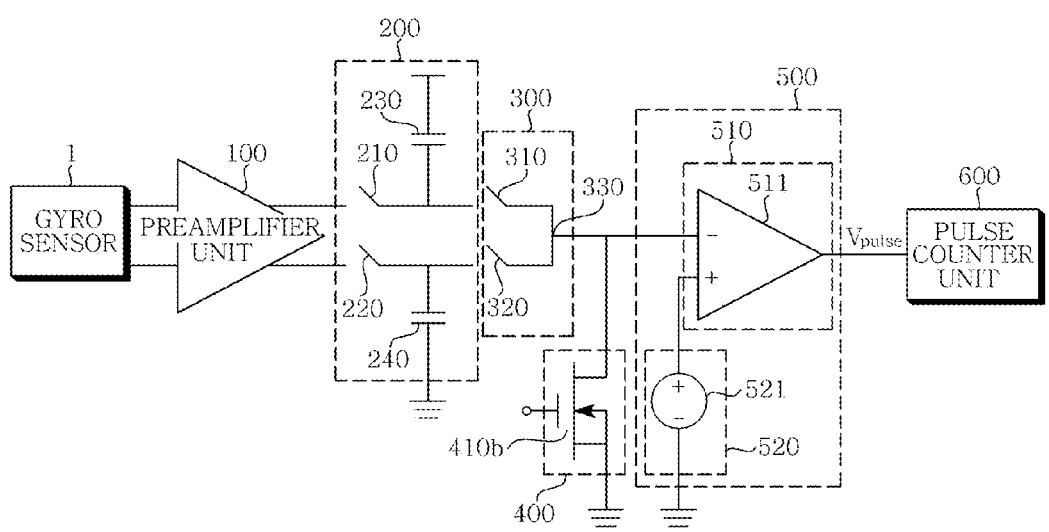
FIG. 4 is a configuration diagram of an apparatus for detecting a gyro sensor signal according to a third preferred embodiment of the present invention.

FIG. 4 is a configuration diagram of an apparatus for detecting a gyro sensor signal according to a third preferred embodiment of the present invention.

The apparatus for detecting a gyro sensor signal according to the third preferred embodiment of the present invention shown in FIG. 4 has the same configuration as that of the apparatus for detecting a gyro sensor signal according to the first preferred embodiment of the present invention shown in FIG. 1, except for a current passing unit 400 and a reference voltage provider 520.

The current passing unit 400 is configured of a resistor 410a unlike the first preferred embodiment of the present invention and only discharges charges charged in the capacitor to a ground.

In addition, the reference voltage provider 520 is also configured of a resistor 520a and provides a predetermined voltage to the comparator 510.

The reference voltage provider 520a may be implemented by a thermistor of which a resistance value increases when a temperature increases. In this case, when an internal temperature of the apparatus for detecting a gyro sensor signal increases, resistance of the thermistor also increases to provide higher reference voltage.

Since configurations and operations of remaining components of the apparatus for detecting a gyro sensor signal according to the third preferred embodiment of the present invention are the same as those of the apparatus for detecting a gyro sensor signal according to the first preferred embodiment of the present invention, a detailed description thereof will be omitted.

Figure 3:
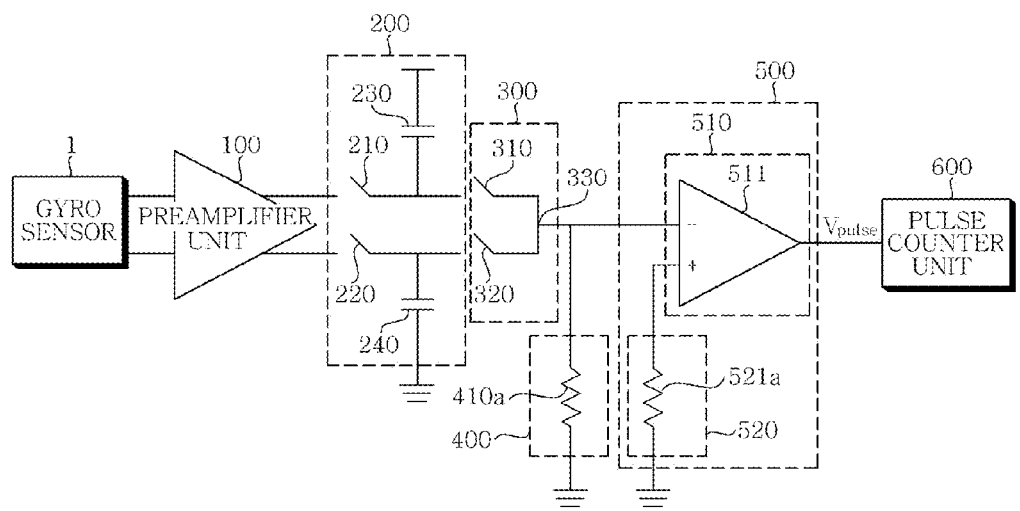
FIG. 3 is a configuration diagram of an apparatus for detecting a gyro sensor signal according to a second preferred embodiment of the present invention.

FIG. 3 is a configuration diagram of an apparatus for detecting a gyro sensor signal according to a second preferred embodiment of the present invention.

The apparatus for detecting a gyro sensor signal according to the second preferred embodiment of the present invention shown in FIG. 3 has the same configuration as that of the apparatus for detecting a gyro sensor signal according to the first preferred embodiment of the present invention shown in FIG. 1, except for a current passing unit 400.

As the current passing unit 400, a metal oxide semiconductor field effect transistor (MOSFET) 410b is used. The MOSFET 410a is always held in a state in which it is turned on to provide a conduction path of the signal output from the averaging unit 300 or is turned on when the switches 310 and 320 of the averaging unit 300 are turned on to provide a conduction path of the signal output from the averaging unit 300. Since configurations and operations of other components of the apparatus for detecting a gyro sensor signal according to the second preferred embodiment of the present invention are the same as those of the apparatus for detecting a gyro sensor signal according to the first preferred embodiment of the present invention, a detailed description thereof will be omitted.

Figure 5:
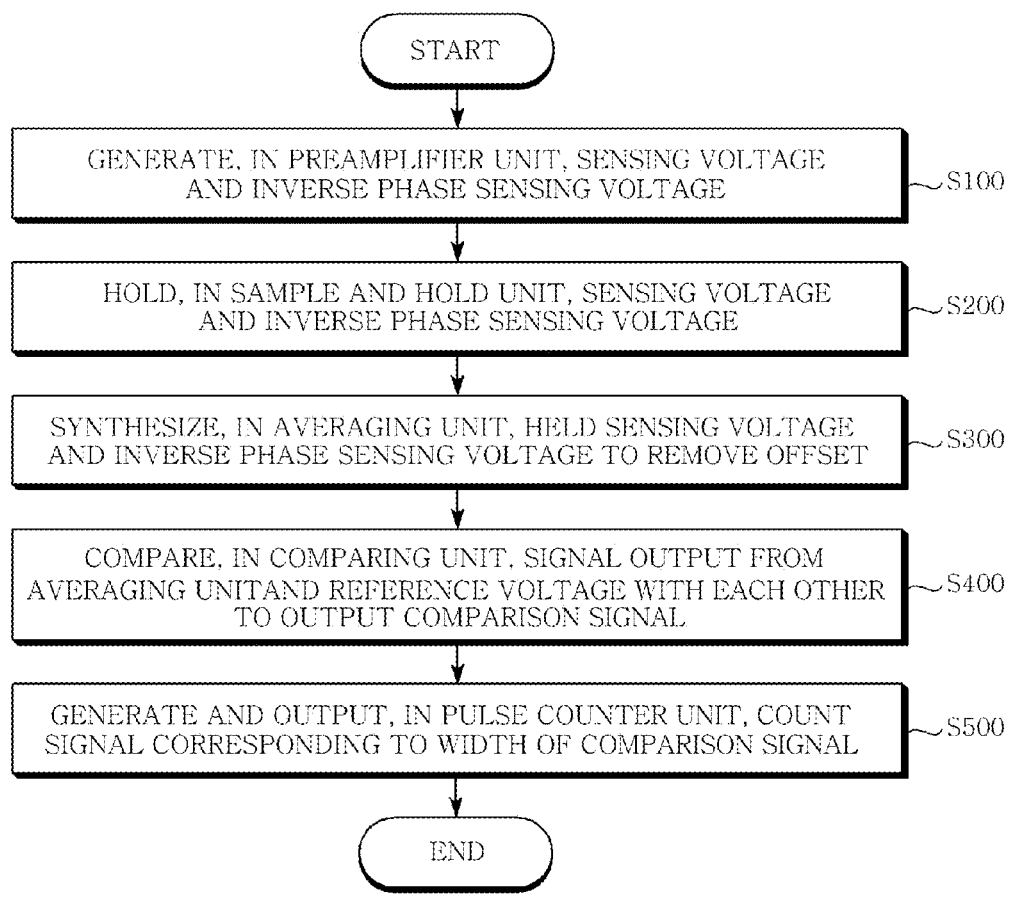
FIG. 5 is a flow chart of a method for detecting a gyro sensor signal according to the first preferred embodiment of the present invention.

FIG. 5 is a flow chart of a method for detecting a gyro sensor signal according to the first preferred embodiment of the present invention.

Referring to FIG. 5, in the method for detecting a gyro sensor signal according to the first preferred embodiment of the present invention, the preamplifier unit 100 converts a change in the charge amount into sensing voltage to output the sensing voltage and at the same time, outputs inverse phase sensing voltage of the sensing voltage that is in proportion to the change in the charge amount (S100).

The offset voltage may be included in the signal output from the preamplifier unit 100. Therefore, in order to obtain accurate output characteristics of the gyro sensor, the offset needs to be removed in the signal output from the preamplifier unit 100.

Then, the sample and hold unit 200 allows the sensing voltage and the inverse phase sensing voltage output from the preamplifier unit 100 to be held as a predetermined value at a predetermined point in time (S200).

More specifically, the sample and hold unit 200 holds and outputs the signal output from the preamplifier unit at a predetermined point in time according to the clock signal ck1 provided at a predetermined period.

In this case, the first capacitor 230 in the sample and hold unit 200 is charged. As described above, the first capacitor 230 is charged, such that a predetermined voltage is held at the output terminal.

In addition, the sample and hold unit 200 is turned on or off according to the clock signal ck2 provided at a predetermined period to hold and output the signal of the inverse phase sensing voltage output from the preamplifier unit 100 at a predetermined point in time.

In this case, the second capacitor 240 in the sample and hold unit 200 is charged. As described above, the second capacitor 240 is charged, such that a predetermined voltage is held at the output terminal.

Then, the averaging unit 300 synthesizes two signals output from the sample and hold unit 200 to remove the offset and then output the signal in which the offset is removed (S300).

That is, the averaging unit 300 passes the signal held and output in the first capacitor 230 and the signal hold and output in the second capacitor 240 therethrough by the clock signal ck3 and synthesizes the signals passing therethrough to output a signal in which the offset voltage is removed.

Next, the signal which is output from the averaging unit 300 and in which the offset is removed is input to the comparing unit 500, and the current passing unit 400 discharges charges charged in the capacitors 230 and 240 of the sample and hold unit 200.

When the charges charged in the capacitors 230 and 240 of the sample and hold unit 200 are discharged by the current passing unit 400, an amplitude of the signal output from the averaging unit 300 is slowly reduced.

Meanwhile, the comparing unit 500 compares the signal output from the averaging unit 300 and a magnitude of the reference voltage with each other to output positive voltage (or negative voltage) when the signal output from the averaging unit 300 is larger than the reference voltage and output negative voltage (or positive voltage) when the signal output from the averaging unit 300 is smaller than the reference voltage (S400).

The voltage of the signal output from the averaging unit 300 is slowly reduced by the current passing unit 400. Therefore, a state transition of an output signal of the comparing unit 500 from positive voltage to negative voltage occurs.

Thereafter, the pulse counter unit 600 counts the number of counting pulses up to before the state transition of the comparison signal output from the comparing unit 500 is generated to generate and output a count signal that is in proportion to a pulse width (S500). As described above, the count signal output from the pulse counter unit 600 is in proportion to the amplitude of the sensing signal.

As set forth above, according to the preferred embodiment of the present invention, an offset removing circuit relatively smaller as compared to the prior art is used, thereby making it possible to reduce a size of the circuit.

In addition, according to the preferred embodiment of the present invention, a digitized signal is generated without using an analog to digital converter, thereby making it possible to simplify a structure and reduce a cost and a size.

Further, according to the preferred embodiment of the present invention, the signal is digitized, such that it is advantageous in view of noise.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An apparatus for detecting a gyro sensor signal, the apparatus comprising:
   a preamplifier unit outputting sensing voltage and inverse phase sensing voltage that are in proportion to a charge amount of a gyro sensor;
   a sample and hold unit holding the sensing voltage and the inverse phase sensing voltage of the preamplifier unit for a predetermined period at a predetermined point in time;
   an averaging unit synthesizing the sensing voltage and the inverse phase sensing voltage held in the sample and hold unit to remove offset;
   a current passing unit providing a current path of output voltage of the averaging unit;
   a comparing unit comparing a signal output from the averaging unit and reference voltage with each other to output a comparison signal; and
   a pulse counter unit counting the number of counting pulses up to before a state transistor of the comparison signal output from the comparing unit is generated to generate and output a count signal.

2. The apparatus as set forth in claim 1, wherein the sample and hold unit includes:
   a first switch passing the sensing voltage output from the preamplifier unit therethrough for a predetermined period at a predetermined point in time;
   a first capacitor charged with a signal passing through the first switch and held at the signal for a predetermined period;
   a second switch passing the inverse phase sensing voltage output from the preamplifier unit for a predetermined period at a predetermined point in time; and
   a second capacitor charged with a signal passing through the second switch and held at the signal for a predetermined period.

3. The apparatus as set forth in claim 1, wherein the averaging unit includes:
   a third switch passing the sensing voltage held in the sample and hold unit therethrough at a predetermined point in time;
   a fourth switch passing the inverse phase sensing voltage held in the sample and hold unit therethrough at a predetermined point in time; and
   a synthesizer synthesizing a signal passing through the third switch and a signal passing through the fourth switch to remove the offset.

4. The apparatus as set forth in claim 1, wherein the current passing unit is a current source connected between an output terminal of the averaging unit and a ground.

5. The apparatus as set forth in claim 1, wherein the current passing unit is a resistor connected between an output terminal of the averaging unit and a ground.

6. The apparatus as set forth in claim 1, wherein the current passing unit is a metal oxide semiconductor field effect transistor (MOSFET) connected between an output terminal of the averaging unit and a ground.

7. The apparatus as set forth in claim 1, wherein the comparing unit includes:
   a reference voltage provider providing the reference voltage; and
   a comparator having one terminal connected to an output terminal of the averaging unit and the other terminal connected to the reference voltage provider and outputting the comparison signal generated by comparing the output signal of the averaging unit and the reference voltage with each other.

8. The apparatus as set forth in claim 7, wherein the reference voltage provider is a voltage source connected between the comparator and a ground.

9. The apparatus as set forth in claim 8, wherein the voltage source provides voltage that is in proportion to a change in temperature.

10. The apparatus as set forth in claim 7, wherein the reference voltage provider is a resistor connected between the comparator and a ground.

11. The apparatus as set forth in claim 7, wherein the reference voltage provider is a thermistor connected between the comparator and a ground.

12. A method for detecting a gyro sensor signal, the method comprising:
   (A) generating and outputting, in a preamplifier unit, sensing voltage and inverse phase sensing voltage that are in proportion to a charge amount of a gyro sensor;
   (B) holding, in a sample and hold unit, the sensing voltage and the inverse phase sensing unit output from the preamplifier unit for a predetermined period at a predetermined point in time;
   (C) synthesizing, in an averaging unit, the sensing voltage and the inverse phase sensing voltage held and output in the sample and hold unit to remove offset;
   (D) comparing, in a comparing unit, a signal output from the averaging unit and reference voltage with each other to output a comparison signal; and
   (E) generating and outputting, in a pulse counter unit, a count signal corresponding to a width of the comparison signal output from the comparing unit.

13. The method as set forth in claim 12, wherein step (B) includes:
   (B-1) allowing the sample and hold unit to pass the sensing voltage output from the preamplifier unit therethrough at a predetermined point in time;
   (B-2) allowing the sample and hold unit to charge a first capacitor with the passed sensing voltage to hold the sensing voltage for a predetermined period;
   (B-3) allowing the sample and hold unit to pass the inverse phase sensing voltage output from the preamplifier unit therethrough at a predetermined point in time; and
   (B-4) allowing the sample and hold unit to charge a second capacitor with the passed inverse phase sensing voltage to hold the inverse phase sensing voltage for a predetermined period.

14. The method as set forth in claim 12, wherein step (C) includes:
   (C-1) allowing the averaging unit to pass the sensing voltage output from the sample and hold unit therethrough;

(C-2) allowing the averaging unit to pass the inverse phase sensing voltage output from the sample and hold unit therethrough; and
(C-3) allowing the averaging unit to synthesize the sensing voltage and the inverse phase sensing voltage to remove the offset.

* * * * *